May 17, 1932.  K. M. BYRON  1,858,878
TRAILER
Filed Oct. 17, 1928    4 Sheets-Sheet 4
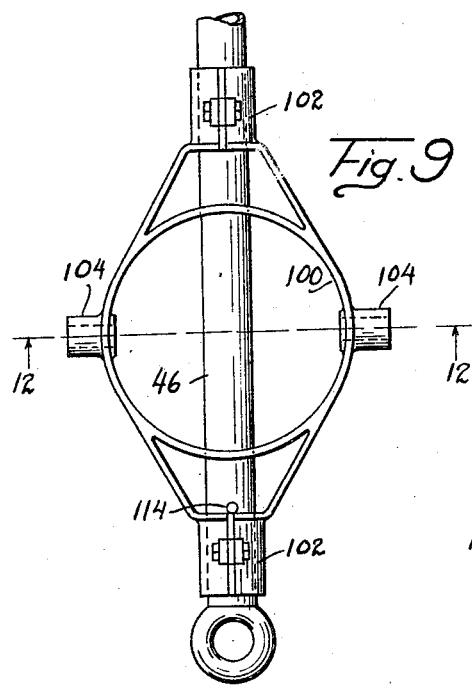
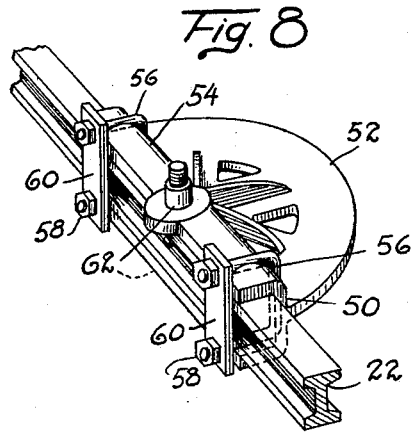
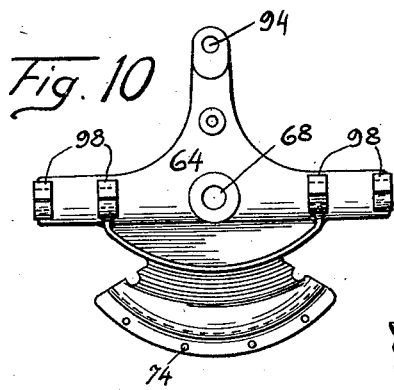
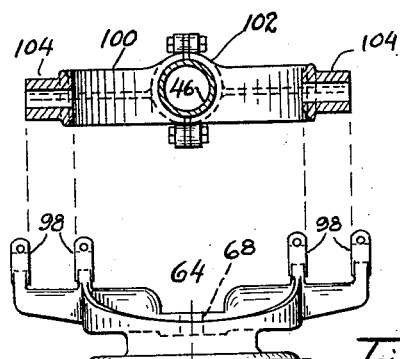
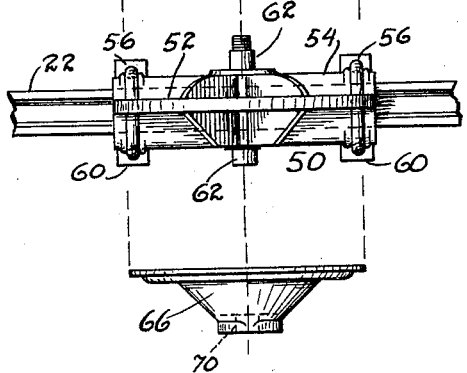
INVENTOR.
Kenneth M. Byron
BY Parker & Burton
ATTORNEYS Patented May 17, 1932

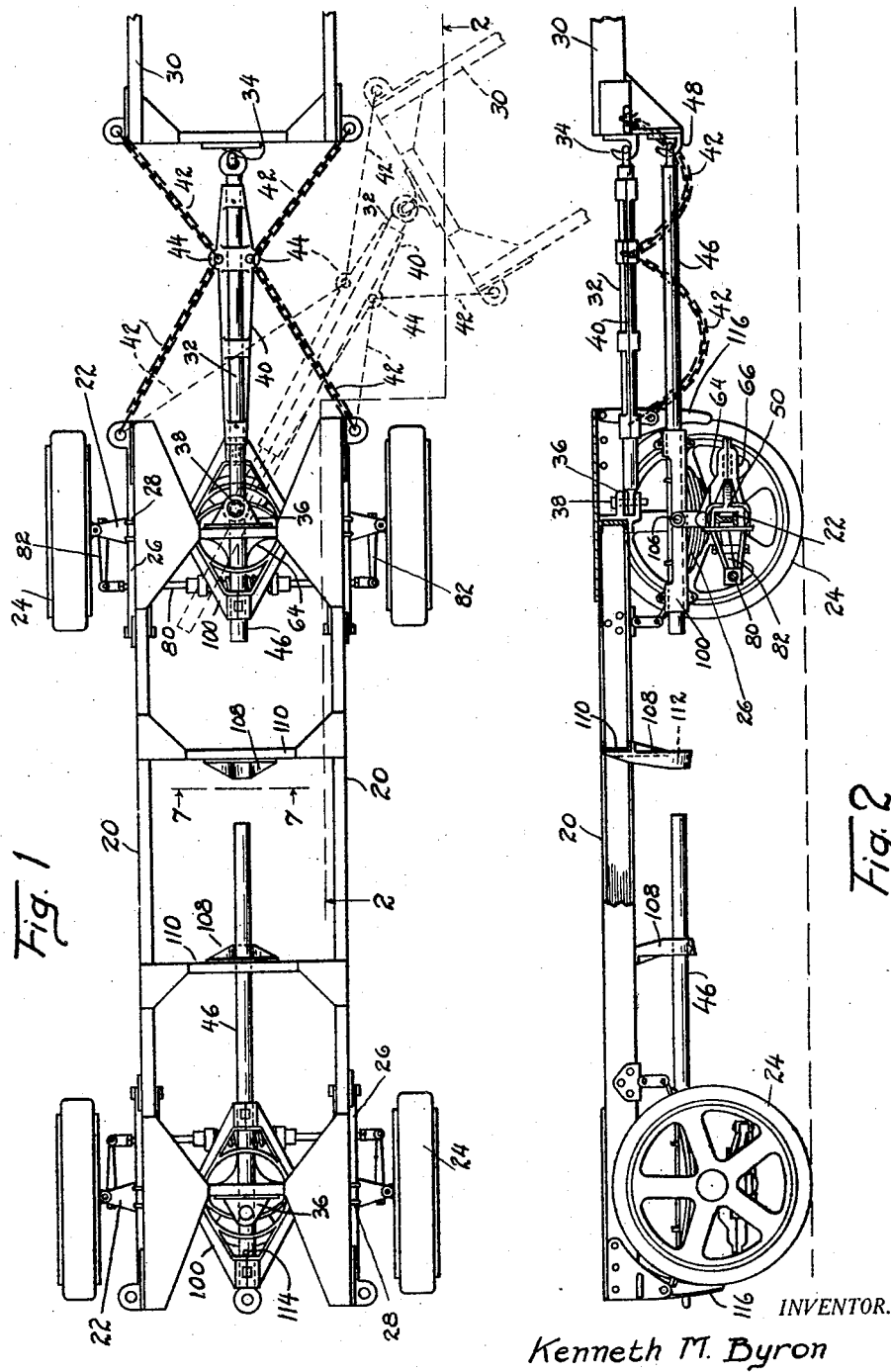

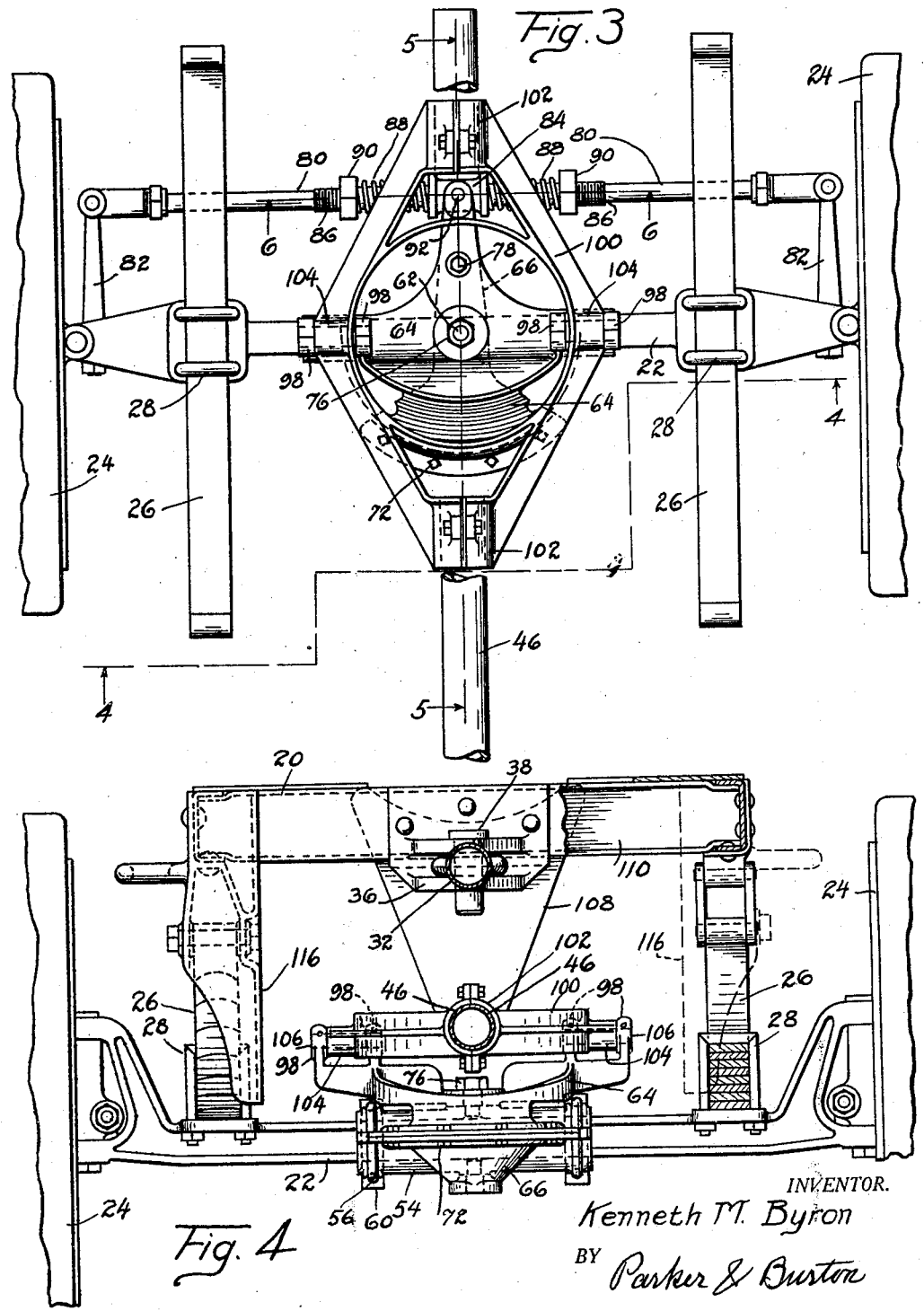

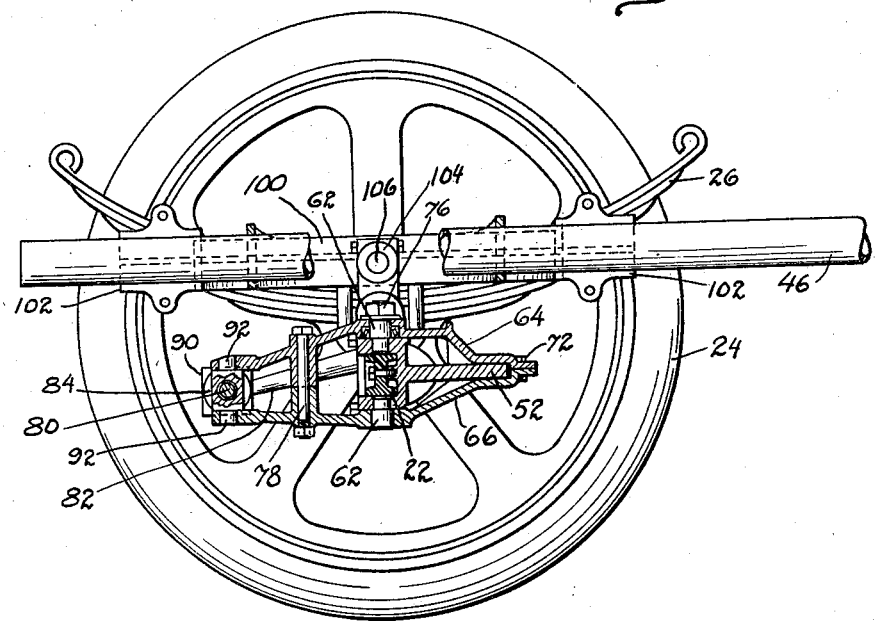
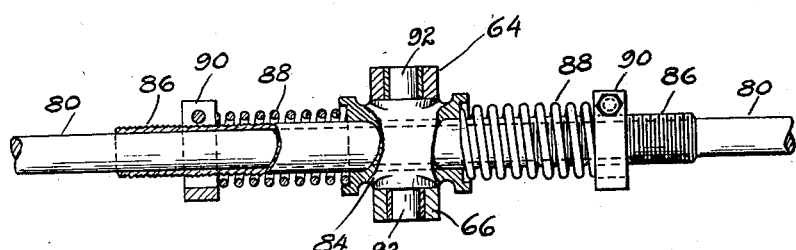
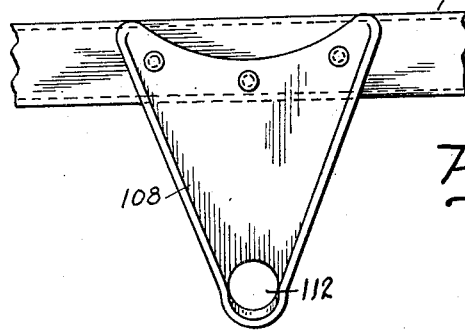

1,858,878

UNITED STATES PATENT OFFICE

KENNETH M. BYRON, OF DETROIT, MICHIGAN, ASSIGNOR TO STEPHEN A. GRIGGS, OF DETROIT, MICHIGAN

TRAILER

Application filed October 17, 1928. Serial No. 312,946.

My invention relates to improvements in trailers and particularly to improved draft and steering mechanism adapted to couple a trailer to a tractor to be drawn and guided thereby.

An object is to provide a trailer which is so coupled with independent motive power, here denominated by the tractor that draws the trailer as to relieve the steering mechanism, which couples the two vehicles together, of substantially all strain of drawing the trailer and to insure against wear of the steering mechanism as a result of strain imposed on the draft connection and to provide steering mechanism which will guide the trailer accurately as it follows the tractor and which is not subject to looseness or play by virtue of wear in use and which practically eliminates the sway of the trailer during travel.

An important feature resides in the provision of draft mechanism independent of the steering mechanism, each responsive to the tractor but each functioning independently of the other. The steering mechainsm is so constructed as to accommodate itself to substantially universal angular movement of the trailer with respect to the tractor and functions at any such angular position while the draft mechanism takes all the strain of hauling the trailer at any angular position wherein it may be placed.

The steering mechanism is so associated with the trailer that the pivotal connections therewith are substantially relieved of all torque action tending to distort the same and this torque force is taken by a rigid bearing which prevents undue wear of the pivotal connections and distortion thereof due to steering the trailer under load at different positions and under widely varying conditions.

My improved steering mechanism includes a steering pole which is adapted to couple the trailer to the tractor for steering and which is adapted for manual employment in the steering of the trailer by hand as during backing or in coupling the same up to the tractor.

It is relatively simple to couple my trailer when loaded to a tractor and if it is not placed properly to readily effect such coupling, the draft means may be connected and when the trailer is put in motion it is easy to bring the steering pole into position to be coupled up with the tractor which of itself is not easy of accomplishment where the steering mechanism and the draft mechanism is arranged as a single unit.

Various other desirable features are embodied in my improved trailer. I provide novel draft means to connect the trailer with the tractor, a novel type of spring hanger which serves also as a bumper, and various novel elements associated in the steering mechanism. These will more fully appear from the following description, appended claims, and accompanying drawings, wherein:

Fig. 1 is a plan of my improved trailer connected to a tractor.

Fig. 2 is a side elevation of the construction shown in Fig. 1 taken partly in section on line 2—2 of Fig. 1.

Fig. 3 is an enlarged fragmentary plan of one end of the trailer.

Fig. 4 is a view taken on the line 4—4 of Fig. 3.

Fig. 5 is a sectional view taken on line 5—5 of Fig. 3.

Fig. 6 is a sectional view taken on line 6—6 of Fig. 3.

Fig. 7 is an elevation taken on line 7—7 of Fig. 1.

Fig. 8 is a perspective of a portion of an axle with the torque sector attached.

Fig. 9 is a plan of the steering pole saddle.

Fig. 10 is a plan of the upper steering arm which supports the saddle.

Fig. 11 is a plan of the lower steering arm.

Fig. 12 shows the saddle, upper steering arm, torque sector and axle fragment, and lower steering arm arranged one above the other in separate spaced apart relationship in the manner such parts would be secured together.

I have shown my invention as embodied in a four wheel trailer comprising a frame 20 provided with axles 22 arranged at front and rear and each carrying swiveled road wheels 24 mounted upon the axles through the employment of steering knuckles of conventional design to permit the wheels at either end of the vehicle to be turned to steer the vehicle. The frame is supported upon the axles by springs 26. The intermediate section of each spring is shown as secured to its axle by U bolts 28 and the ends of the spring are secured by shackles and brackets to the frame. The trailer is shown as attached to the rear end of a tractor indicated as 30 through the employment of improved draft and steering means which embodies novel combinations and features hereinafter claimed.

The draft means employed is separate and distinct from the steering mechanism and I provide a draft bar 32 having an eye at one end adapted to be received over a hook 34 on the tractor to couple the trailer to the tractor and an eye at the opposite end adapted to be secured within a bracket 36 mounted on the trailer frame by a pin 38. This draw bar is reinforced on opposite sides by a sleeve or sheath 40 secured thereto. A pair of draft chains 42 are secured to an eye 44 on one side of the draft bar and have their opposite ends secured to the tractor and trailer as indicated. A similar pair of draft chains 42 are secured to a corresponding eye on the opposite side of the draft bar and have their ends connected to the adjacent sides of the trailer and tractor in a similar manner. These chains serve as emergency draft connections and limit the angular displacement of the draft bar with respect to the trailer and tractor in any direction.

The steering mechanism is, as above stated, entirely independent of the draft means and it includes a steering pole 46 having an eye at one end adapted to receive a hook 48 mounted on the tractor below the hook 34. This pole is slidably coupled with novel steering mechanism on the trailer. This steering mechanism includes a torque sector 50 which is rigidly secured to the axle 22. This torque sector is shown in perspective in Fig. 8 and comprises a flat plate sector shaped portion 52 and a U-shaped channel portion 54 which embraces the axle 22 and is secured thereto by U bolts 56 provided with nuts 58 and tie plates 60 so that the torque sector is rigid with the axle. This torque sector is provided above and below the axle with a steering arm bearing 62. Upper and lower steering arms are mounted on these bearings.

In Fig. 12 these steering arms are shown in elevation, positioned above and below the torque sector ready to be mounted thereupon. The upper steering arm is indicated generally by the numeral 64 and the lower steering arm by the numeral 66. The upper steering arm is shown in plan in Fig. 10 and the lower steering arm in plan in Fig. 11.

Figs. 2 and 5 show these steering arms mounted upon the bearings on the sector. The upper steering arm 64 is provided with a bearing 68 adapted to be received over the upper bearing 62 of the sector and the lower steering arm 66 is provided with a bearing 70 adapted to be received over the lower bearing pin 62 of the sector. These two steering arms are then secured together. They are bolted together at their front margins by bolts 72. In Figs. 10 and 11 these front marginal portions are shown as provided with registering bolt apertures 74 adapted to receive the bolts 72.

The steering arms are so shaped that they have portions adjacent the bolted together margins which embrace the sector portion 52 of the rigid sector member secured to the axle so that any torque applied to the steering arms tending to displace their pivotal axis upon the bearings 62 is taken by this torque member 52 instead of being transmitted to the bearings 62. The upper bearing 62 is shown as having a threaded upper end upon which is secured a nut 76. A tie bolt 78 extends through apertures in the steering arms located rearwardly of the axle 22 and secures the rear end portions of said steering arms together.

Rearwardly of the axle 22 the united steering arms are connected with the tie rod 80 which connects the steering arms 82 of the steering knuckles together to swivel the wheels. This connection between the tie rod 80 and the united steering arms of the trailer steering mechanism is accomplished through providing a thrust block 84 which is mounted upon a sleeve 86 secured upon the intermediate portion of the tie rod 80 and held in place thereon by springs 88 bearing against opposite ends of the block and adjusted as to tension by adjusting nuts 90 threaded upon the opposite threaded ends of the sleeve. The thrust block 84 is provided above and below the tie rod with bearing pins 92 and the upper steering arm has a bearing 94 which engages over the upper bearing pin and the lower steering arm has a bearing 96 which engages over the lower bearing pin so that the upper and lower steering arms are connected as a unit with the thrust block 84 to exert a pressure through said block and the springs upon the tie rod 80 to steer the wheels 24. Through the adjustment of the nuts 90 the thrust block may be positioned lengthwise of the tie rod and the tension upon the springs may be varied as desired.

The upper steering arm 64 is adapted to receive a steering pole saddle and for this purpose is provided with two pair of spaced apart upright bearing brackets or arms 98. A steering pole saddle 100 is provided with aligned steering pole bearings 102 arranged at the front and rear and adapted to receive slidably therethrough the steering pole 46 as appears in Figs. 1, 2, 3, 4 and 9. The steering pole saddle is provided on opposite sides with bearings 104 which are received between the upright arms 98 of the upper steering arm and suitable bearing pins 106 mounted therein to secure the saddle to swing vertically upon these horizontal bearings.

It will be seen that as the steering pole is moved either to the right or left it swings the united upper and lower steering arms through its connection with the steering pole saddle 100 and that the mounting of the saddle permits the rise and fall of the steering pole to accommodate for any position at which the trailer may be placed either above or below the rear end of the tractor. The steering pole is freely slidable in its mounting in the saddle and accommodates itself without strain to various positions of the trailer. If one side or one end of the trailer is in a depression tending to place a torque upon the steering mechanism against its vertical pivotal axis, this torque is taken by the rigid steering sector 52 secured to the axle and is not thrown upon the pivotal connections of the steering mechanism.

Each end of the trailer is similarly constructed so that the construction at one end only is described, but in Figs. 1 and 2 of the drawings the steering pole is shown at the rear end of the trailer as moved underneath the trailer frame and supported by a hanger or sling 108. This sling 108 is shown in Fig. 7 and is carried by a cross frame member 110 of the trailer frame. It is provided with side walls diverging from an aperture 112 through which the steering pole is adapted to be moved. Suitable means such as a pin 114 may be employed to secure the steering pole in this retracted position.

It will be seen that the end of each spring which is disposed in proximity to the end of the trailer frame is carried by a novel type of spring bracket 116 which not only serves to carry the front end of the spring but depends therebelow as indicated to serve as a vertical bumper which is adapted to contact a horizontal bumper or the rear end of the tractor.

In the steering of my improved trailer it is apparent that all the strain of drawing the trailer is taken by the independent draft means and any wear which ordinarily results from such strain is thus taken by this draft connection and is not imposed, as would otherwise be the case, upon the steering mechanism. The steering mechanism is therefore free to steer the vehicle without having to carry the strain of hauling the vehicle and wear and distortion of the steering mechanism due to such strain is therefore eliminated. This is true notwithstanding that the trailer may be disposed at various positions either above or below or to one side of the rear end of the tractor and any torque which might otherwise be placed upon the pivotal connections of the steering mechanism is taken by the torque plate mounted upon the axle. It will be seen that when the steering pole is withdrawn underneath the trailer and secured in the sling 108 that it locks the swiveled wheels at such end of the trailer against turning.

It will furthermore appear, due to the provision of the emergency draft chains, that should the draft bar break during use, these chains would serve as draft connections and the steering pole would maintain its connection between the trailer and the tractor to steer the trailer and prevent it from running wild to one side or the other except as limited by the chains.

It is also apparent that both ends of the trailer may be steered at the same time, the one end by virtue of its connection with the tractor and the other end through the manual use of the steering pole so that the trailer may be worked sideways crab-like into a position alongside a loading car or a curb.

What I claim is:

1. In combination with a tractor, a trailer having road wheels swiveled for turning, steering mechanism coupled therewith and provided with spaced apart front and rear steering pole bearings, draft means connecting the trailer with the tractor and a steering pole slidably supported within said bearings and coupled with the tractor.

2. In combination with a tractor, a trailer having road wheels swiveled for turning, steering mechanism coupled therewith comprising a vertically tiltable saddle provided with steering pole bearings, draft means connecting the trailer with the tractor and a steering pole slidably supported within said bearings and coupled with the tractor to be actuated thereby.

3. In combination with a tractor, a trailer having road wheels swiveled for turning, steering mechanism coupled therewith comprising a steering arm pivotally supported for turning movement about a substantially vertical axis, a saddle pivotally supported upon said arm for vertical tilting movement, said saddle provided with a steering pole bearing and a steering pole slidably supported within said bearing and coupled with the tractor to be actuated thereby to swing the steering arm about its vertical axis.

4. In combination with a tractor, a trailer having road wheels swiveled for turning, steering mechanism for the trailer comprising a steering arm swiveled upon a vertical axis for turning, a saddle pivotally supported upon said arm upon a horizontal axis for tilting, and a steering pole slidably adjustably coupled with the saddle at one end and coupled with the tractor at the opposite end to be actuated thereby to turn said steering arm and means coupling said arm with the road wheels to turn said wheels.

5. In combination with a tractor, a trailer having a frame supported upon an axle having road wheels swiveled for turning, draft means coupling the frame of the trailer with the tractor to be drawn thereby, a steering arm swiveled upon the axle for turning about a vertical axis, a saddle pivoted upon said arm for tilting about a horizontal axis, a steering pole coupling the saddle with the tractor whereby the saddle is actuated by the tractor to swivel the steering arm upon its axis, and means coupling the said arm with the road wheels to turn said wheels.

6. In combination with a tractor, a trailer having a frame supported upon an axle having road wheels swiveled for turning, draft means coupling the trailer with the tractor to draw the trailer, a steering arm extending above and below the axle and pivotally supported for turning upon bearings arranged above and below the axle, steering pole supporting means pivotally mounted upon said arm for vertical tilting, a steering pole coupled with said supporting means and connected with the tractor to be actuated thereby to turn said steering arm and means coupling the road wheels with said arm for turning.

7. In combination with a tractor, a trailer having a frame supported upon an axle having road wheels swiveled for turning, draft means coupling the frame of the trailer with the tractor to be drawn thereby, steering mechanism comprising a steering arm extending above and below the axle and supported for turning upon bearings arranged above and below the axle, means coupling said arm with said road wheels to turn the wheels, and means coupling the tractor with the arm to swing the arm, said last named means vertically tiltably connected with the arm.

8. In combination with a tractor, a trailer having a frame supported upon an axle having road wheels swiveled for turning, draft means coupling the frame of the trailer with the tractor to be drawn thereby, steering mechanism comprising a steering arm pivotally supported above and below the axle for turning about a vertical axis, means coupling the road wheels with the steering arm rearwardly of the axle to turn said wheels, and means supported by the steering arm above the axle for relative vertical tilting movement coupling the steering arm with the tractor to be actuated thereby.

9. In combination with a tractor, a trailer having a frame supported upon an axle having road wheels swiveled for turning, draft means coupling the trailer frame with the tractor, steering mechanism comprising means swiveled upon the axle for turning about a vertical axis and coupled with the wheels, to turn the wheels and means coupling said swiveled means with the tractor to be actuated thereby to turn the wheels, said last named means pivotally supported upon the means swiveled on the axle for tilting about a horizontal axis.

10. In combination with a tractor, a trailer having a frame supported upon an axle having road wheels swiveled for turning, draft means coupling the trailer frame with the tractor, steering mechanism comprising means universally coupled at one end with the tractor and extensibly universally coupled at the opposite end with the trailer and having a part coupled with the road wheels to turn said wheels.

11. In combination with a tractor, a trailer having a frame supported upon an axle having road wheels swiveled for turning, draft means coupling the trailer frame to the tractor, steering mechanism comprising means coupling the tractor with the road wheels including a part swiveled upon the axle for turning about a vertical axis and a torque sector carried by the axle engaging said part to prevent tilting of the part with respect to its axis.

12. In combination with a tractor, a trailer having road wheels swiveled for turning, steering mechanism comprising a steering arm having vertically spaced apart sections swiveled for turning as a unit about a vertical axis, a stationary torque sector interposed between said arm sections to prevent tilting of the arm with respect to its axis, means coupling the arm with the tractor for actuation thereby and means coupling the arm with the road wheels to turn said wheels.

13. In combination with a tractor, a trailer having an axle provided with road wheels swiveled for turning, steering mechanism comprising a steering arm having upper and lower arm sections pivoted above and below the axle for turning about a vertical axis and coupled with the tractor to be actuated thereby and with the road wheels to turn the wheels, and a torque sector carried by the axle and interposed between said sections to prevent tilting thereof with respect to said axis of rotation.

14. A trailer having a frame supported upon road wheels swiveled for turning, steering mechanism including a pivotally supported steering arm coupled with the wheels to turn the wheels, a steering pole slidably coupled with the arm, means carried by the trailer spaced rearwardly of the arm adapted to engage the pole to lock the arm against turning, said pole adapted to be drawn forwardly from the arm and out of engagement with said means releasing the arm to turning movement by the pole.

15. In combination with a tractor, a trailer, a draft bar pivotally connected at one end to the tractor and at the opposite end to the trailer, a flexible draft connection arranged on each side of the draft bar and coupled at one end to the tractor and at the opposite end to the trailer, each connection being secured intermediate its ends to the draft bar intermediate its ends and adapted to limit the swinging movement of the draft bar.

16. In combination with a tractor, a trailer, a draft bar pivoted at one end to the tractor and at the opposite end to the trailer, a reinforcement secured to the said draft bar and a pair of flexible draft connections secured intermediate their ends to said reinforcement upon opposite sides of the draft bar, each connection having one end secured to the tractor and the opposite end secured to the trailer, an intermediate portion of each connection being secured to an intermediate portion of the draft bar to limit the swinging movement thereof.

17. In combination with a tractor, a trailer having road wheels swiveled for turning, steering mechanism coupled therewith and provided with spaced apart front and rear steering pole bearings, draft means connecting the trailer with the tractor, and a rigid steering pole slidably supported within said bearings and coupled with the tractor to actuate the steering mechanism.

18. In combination with a trailer vehicle, steering mechanism comprising a fixed axle, a supporting road wheel swivelled to each end of said axle, a torque plate rigidly secured to said axle along a substantial portion of its length and provided with a bearing above and below said axle, steering arms pivotally supported by said bearings and having an end thrust against said torque plate, operative connections between said steering arms and each of said supporting road wheels, and a steering pole operable to rotate said steering arms.

19. In combination with a trailer vehicle having a swivelled wheel at each end of a fixed axle, a torque plate secured to said axle and extending along a substantial portion of its length, steering arms pivotally supported by said torque plate above and below said axle and having a thrust bearing against said plate, a steering pole supported by said arms for vertical rockable movement and adapted to actuate the same, and operative connections between said arms and wheels.

In testimony whereof, I, KENNETH M. BYRON, sign this specification.

KENNETH M. BYRON.